Jan. 10, 1939. G. F. FRIAUF ET AL 2,143,770
MANUFACTURE OF CARBON BLACK
Filed Jan. 23, 1935
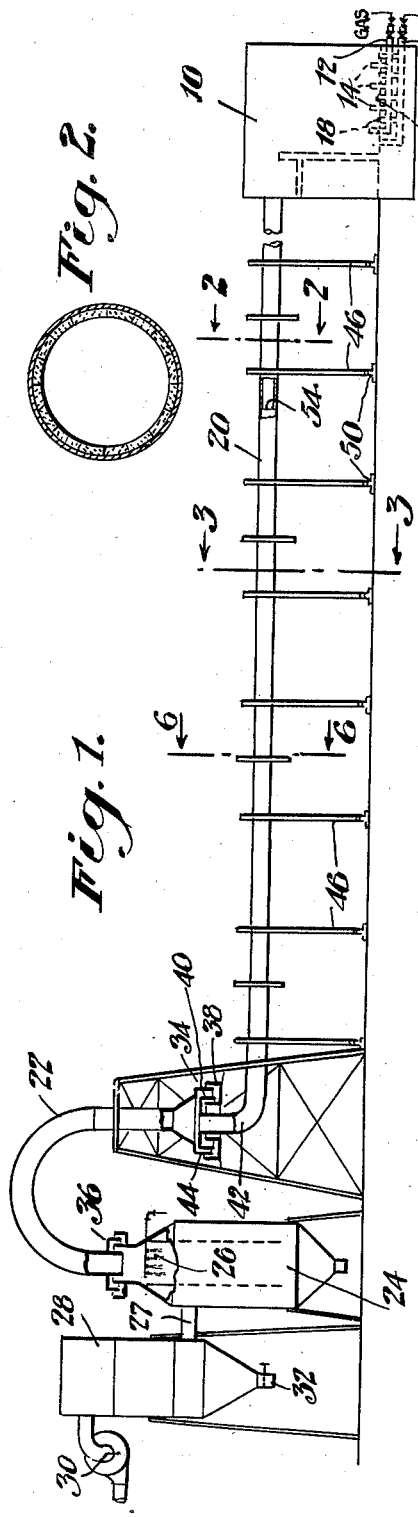
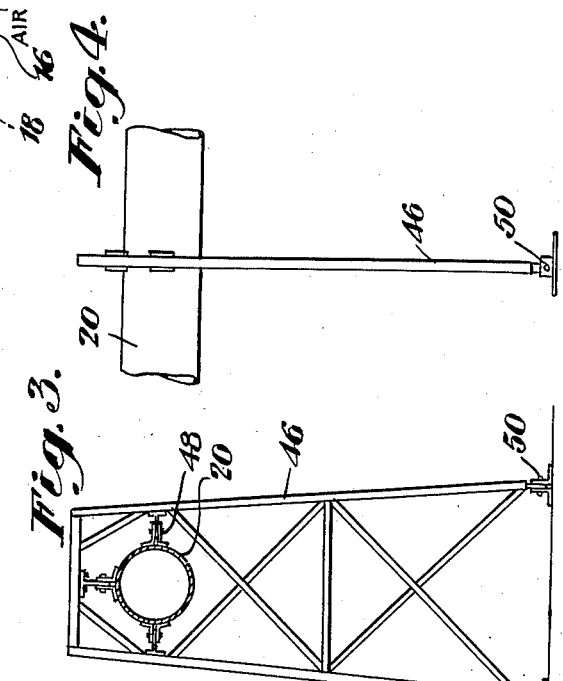
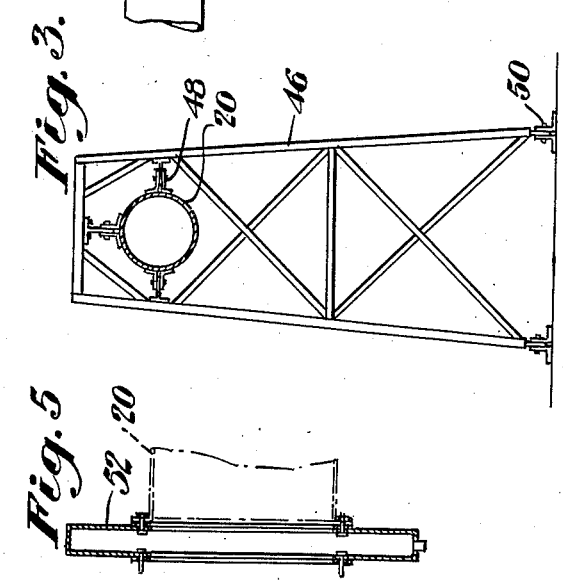
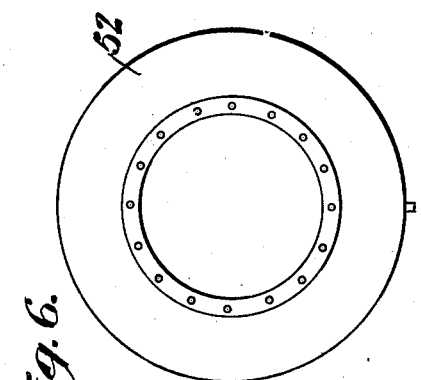
INVENTORS
GEORGE F. FRIAUF
FRANK M. PERRY
BY
Edmund G. Borden
ATTORNEY Patented Jan. 10, 1939

2,143,770

UNITED STATES PATENT OFFICE 2,143,770

MANUFACTURE OF CARBON BLACK

George F. Friauf and Frank M. Perry, Pampa, Tex., assignors to General Atlas Carbon Company, Dover, Del., a corporation of Delaware Application January 23, 1935, Serial No. 3,073

1 Claim. (Cl. 134—60)

This invention relates to the manufacture of carbon black, and more particularly to an improved air cooling system whereby the hot gaseous residue of a hydrocarbon cracking and carbon forming reaction may be cooled or partially cooled in a manner which greatly increases the yield and improves the quality of carbon recovery per unit of capacity of the carbon collecting equipment.

Methods heretofore employed for recovering carbon black from the hot gaseous residue of a hydrocarbon cracking reaction have generally involved either collection of the black on chilled metal surfaces as in the channel processes, or collection in bags or electrical precipitators after cooling the gas by direct contact with water sprays, or by rapid so-called "shock" cooling by refrigeration or the like. This present practice in this art is far from efficient both with respect to the yield and quality of the carbon recovered, and also with respect to the low unit capacity and operating and replacement costs of the cooling and black collecting apparatus.

The primary object of the present invention is to provide a method of cooling hot gases carrying carbon in suspension whereby the temperature of such gases is lowered to a point where separation of the carbon from the gas may be effected more efficiently than heretofore. Other objects of the invention are: To increase the unit capacity and reduce the operating expense of carbon black recovery apparatus; to reduce to a minimum the problems of cooling water overflow and of sludge disposal; to reduce the insulation requirements of carbon black recovery apparatus; and to reduce equipment corrosion in carbon black recovery apparatus and thereby improve the quality of carbon black recovered.

To accomplish the above objects, and to remedy some of the aforementioned defects in prior practice and apparatus, the present invention contemplates conducting the hot gaseous residue of a hydrocarbon cracking reaction (carrying carbon in suspension) directly from the cracking furnace into and through an air condenser which consists of a long straight pipe of cross section so restricted with respect to its length and to the volume of gas handled, that no substantial deposition of carbon will take place within the pipe while the gas is traversing the length thereof and is gradually and progressively cooled by indirect heat transfer to the surrounding air to a temperature at least 30% to 50% below that at which it enters the pipe. The present invention is based on the discovery that the hot gaseous residue of a hydrocarbon cracking reaction containing carbon black in suspension can be efficiently cooled by passing it through a straight pipe air condenser having a length at least thirty to forty times its greatest cross sectional dimension, and that practically all of the carbon originally carried by the gas can be efficiently recovered in a flocculent and uncontaminated state without substantially increasing the gas volume, and while avoiding any serious problem of cooling water overflow and of carbon sludge disposal.

With the above and other objects and features in view, the invention consists in the improved carbon black recovery apparatus and practice which is hereinafter more particularly described and defined in the accompanying claim.

In the accompanying drawing,

Fig. 1 is a view in vertical side elevation of a preferred embodiment of the carbon black cooling and collecting apparatus of the present invention.

Fig. 2 is a cross sectional view of the cooling pipe taken on the line 2—2 of Fig. 1.

Fig. 3 is an enlarged front elevation of one of the cooling pipe supporting members taken on the line 3—3 of Fig. 1.

Fig. 4 is a side elevation of the pipe supporting member shown in Fig. 3.

Figs. 5 and 6 are respectively vertical section and end elevation views of the expansion diaphragm employed between sections of the pipe condenser.

Referring to the drawing, and particularly to Fig. 1, 10 designates a furnace in which fluid hydrocarbon is subjected to high temperature cracking for the purpose of dissociating the hydrocarbon to produce carbon black. The hydrocarbon may be introduced to the furnace from a manifold 12 through a plurality of burners 14, and the cracking temperatures may be continuously maintained by incomplete combustion reactions between hydrocarbon introduced through burners 14 and air introduced from a manifold 16 through air ports 18. As previously indicated, the carbon black recovery system which forms the subject of the present invention is not limited to any particular method for producing carbon black.

The hot gaseous residue of the cracking reaction which takes place in furnace 10 normally has a temperature of 1800° to 2500° F. at the time it leaves the furnace. In order to cool this gas to a temperature at which carbon carried in suspension therein may be separated therefrom most efficiently, the present invention contemplates conducting the gas from furnace 10 through a long straight air cooled condenser 20. Condenser 20 is so dimensioned that gas removed from the furnace 10 through the condenser traverses the length thereof at a velocity at which no substantial deposition of carbon takes place on the inner walls of the condenser pipe. From condenser pipe 20 the hot gaseous products of the cracking reaction may pass through a reverse U-bend 22 into the top of a final cooler 24 wherein the temperature of the gas is finally lowered to a substantially fixed temperature by means such for example as water sprays 26 directly contacting the hot gases passing through cooler 24. Gases which exit from cooler 24 through pipe 27 are at a temperature best adapted for separation of carbon black therefrom, as for example in an electrical precipitator 28. The clean gases may be removed from the system by a blower 30, and the carbon black which collects at the base of separator 28 is withdrawn to storage through discharge chute 32.

Since the gases leave the cracking furnace at a temperature which is normally in the neighborhood of 2500° F., and since the temperature of these gases is reduced at least 30% to 50% during the passage of the gas through air condenser 20, it will be apparent that the condenser is subjected to a considerable amount of thermal distortion. Longitudinal expansion and contraction of the cooler pipe 20 and of the bend 22 is permitted by sliding water seals designated respectively 34 and 36 (see Fig. 1). The sliding water seal 34 consists of an annular channel 38 having side walls of ample depth to maintain a seal for overhanging skirts 40 on the elbow joint 42 of pipe 20, and for the depending end 44 of bend 22. Transverse distortion of the cooling pipe is substantially prevented by supporting frames 46 which are disposed at frequent intervals along the length of the pipe, and to the top of which the pipe is rigidly attached by straps 48. The frames 46 have pivotal base mountings 50 (Fig. 3) which allow the frame to swing with any longitudinal expansion and contraction of pipe 20. Any warping in the pipe 20 caused by a variation of temperature around its circumference is taken care of by expansion diaphragms or bellows 52 located between each second supporting frame 46. (See Figs. 5 and 6.) While the apparatus is designed for operation with a minimum deposition of carbon on the interior of pipe 20, it has been found that in practice a slow deposition takes place which gradually builds up an insulating layer of carbon on the interior of the pipe, so that the temperature of the gas delivered from the discharge end of pipe 20 gradually increases, thereby increasing the cooling load on cooler 24. It normally takes several hours to build up a carbon deposit in pipe 20 of sufficient depth to seriously affect the operation of the cooler. An important feature of the present invention is based on the discovery that by suspending the operation of furnace 10 for a period of about five minutes every few hours, while continuing the introduction of air to the furnace through ports 18, the furnace can be operated as an air preheater and any carbon deposited in pipe 20 is rapidly burned out by reaction with this preheated air. Thus by these brief periodic shut-downs and air blast treatments, the interior of pipe 20 is kept sufficiently clear of carbon deposit so that the efficiency of the pipe 20 as an air condenser is kept at a high value. In view of the high temperatures which are developed in furnace 10 and in pipe 20 by the preceding operations, and particularly by the combustion which takes place in pipe 20 during the brief periodic air blast periods, it has been found advantageous to line the pipe for about one fourth its length adjacent furnace 10 with a thin refractory heat resistant lining shown as extending from the furnace to point 54. This lining does not seriously affect the heat transfer capacity of the pipe, and serves to protect the pipe from unduly high temperatures and to prevent any substantial carbon deposition on the lined section.

When employing direct water sprays as the sole means of cooling cracked hydrocarbon gas carrying carbon in suspension, it has been found that water vapor constitutes over 50% by volume of the gas-vapor mixture passing from the cooler to the carbon collection equipment. The unit capacity of the cooling and collecting equipment can be increased from 50% to 100% by employing an air cooler to carry from one third to one half the cooling load. Operating comparison of a plant equipped for partial air cooling with one employing only water cooling has shown that when both plants are handling approximately 12,000 cu. ft. per minute of hot gas delivered to the cooler at approximately 2200° F., and discharged by the cooler at 425° F., the plant employing partial air cooling to drop the gas temperature to about 1200° F., (followed by water cooling) used only about 40% the volume of cooling water, with a resultant increase in collector capacity of at least 30%, and a saving in carbon loss of sludge of about 75%. Use of high temperature alloy steel pipe instead of refractory lined pipe in the section of the air cooled adjacent the furnace further increases the efficiency of the cooler, which consisted of a straight pipe having an internal diameter of 3¼ feet and a length of approximately 150 feet. In operating this cooler, the furnace was shut down once every eight hours for a period of five minutes while passing preheated air therethrough to burn out deposited carbon. The reduction effected in cooling water requirements has the further advantages of lowering the dew point of the gas entering the collector, thereby reducing the insulation requirements for the collector and materially reducing corrosion with corresponding improvement in the quality of the recovered carbon.

The invention having been thus described, what is claimed as new is:

In a process for recovering carbon black from the hot gaseous residue of a substantially continuous fluid hydrocarbon cracking and carbon black producing reaction, the improved method of dry-cooling the gas which consists in conducting the hot gas at a temperature above 2000 degrees F. into and through a straight confined substantially horizontal cooling zone of great length and restricted cross section at a velocity such that no substantial deposition of carbon takes place while the temperature of the gas is gradually reduced at least 30% to 50% by heat transfer to atmosphere through heat conductant walls confining such zone, and every few hours suspending the cracking operation for a few minutes while burning off carbon deposited on the confining walls of the cooling zone by passing air in series through the cracking zone to absorb heat and preheat the air and thence through the cooling zone.

FRANK M. PERRY.
GEORGE F. FRIAUF.